United States Patent Office 3,749,722
Patented July 31, 1973

3,749,722
METHOD FOR PREPARING AMIDES OF TRI-
MELLITIC ANHYDRIDE AND PRODUCT
THEREFROM
Fred F. Holub, Schenectady, N.Y., assignor to
General Electric Company
No Drawing. Continuation-in-part of application Ser. No.
741,310, July 1, 1968, which is a division of applica-
tion Ser. No. 638,636, May 15, 1967, now Patent No.
3,435,002. This application May 25, 1971, Ser. No.
146,792
Int. Cl. C07c 51/70
U.S. Cl. 260—268 C                       1 Claim

ABSTRACT OF THE DISCLOSURE

Amides of trimellitic anhydride can be prepared by re-
acting the latter directly with a disecondary amine at
elevated temperatures and by a rearrangement reaction in-
volving the elimination of water to obtain the amide di-
anhydride. Polyamide acid resins and polyamide imides
can be prepared from such compositions.

This application is a continuation-in-part of my U.S.
patent application Ser. No. 741,310 filed July 1, 1968
(now U.S. Pat. 3,632,608, issued Jan. 4, 1972) which in
turn is a division of my U.S. patent application Ser. No.
638,636, filed May 15, 1967, now U.S. Pat. 3,435,002,
issued Mar. 25, 1969, all assigned to the same assignee as
the present invention.

This invention is concerned with a process for preparing
amides of trimellitic anhydride. More particularly the in-
vention pertains to a process which comprises effecting
reaction at elevated temperatures directly between trimel-
litic anhydride and a disecondary aliphatic (including
cycloaliphatic) amine of from 2 to 12 carbon atoms,
whereby water is removed at the elevated temperatures to
effect formation of a composition corresponding to the
formula (I) 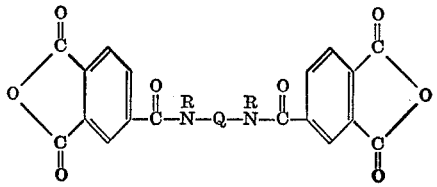

where Q is a divalent aliphatic hydrocarbon radical
residue of the aforesaid disecondary amine having from
2 to 12 carbon atoms (e.g., ethylene, propylene, iso-
propylidene, trimethylene, hexylene and its isomers of
the linear formula —$C_6H_{12}$—, decylene, dodecylene)
where R is a monovalent hydrocarbon radical (e.g., ali-
phatic, aromatic, etc.) of from 1 to 6 carbon atoms.

U.S. Pat. 3,183,043 describes the preparation of amides
of trimellitic anhydride corresponding to Formula I,
where R is hydrogen, whereby trimellitic anhydride is in-
tended to be reacted with, e.g., ethylene diamine, to
form the desired amide of trimellitic anhydride. There
are several disadvantages in employing this process for
making amides of trimellitic anhydride. In the first place,
it is necessary to convert the amine to the acetamide
which obviously injects an extra step and adds to the
cost of making the amide of trimellitic anhydride. In addi-
tion, the evolution of acetic acid requires precautions as
to the corrosiveness of the acid. Furthermore, if one uses
the primary diamine directly, this leads to the formation
of the imide structure because of the preferred reaction
of the primary amine group with the anhydride group,
thus frustrating the formation of the dianhydride.

Unexpectedly I have discovered that I can prepare di-
anhydrides of Formula I by effecting reaction between
trimellitic anhydride and a disecondary aliphatic amine
directly by heating the mixture at a sufficiently high tem-
perature to remove water. Rather than obtaining an acid
amide as might be expected, one obtains unexpectedly an
intermolecular transamidation to give the dianhydride
of Formula I.

The amides of trimellitic anhydride formed by my
process have many uses. Thus, they can be used to effect
curing of epoxy resins to the substantially infusible and
insoluble state; such compositions are especially useful
as casting compositions for electrical motors, etc. In addi-
tion, these dianhydrides can be reacted with primary di-
amines such as m-phenylenediamine, ethylenediamine, tri-
methylenediamine, o, m, or p-xylylenediamine, 4',4'-oxy-
dianiline, 4,4'-methylenedianiline, etc. in the manner
described in British Pat. 570,858 and in U.S. Pat.
3,277,043 issued Oct. 4, 1966, to form polyamide acid
resins which can be converted by heat to high temperature
polyimides useful as insulation for electrical conductors,
as dipping varnishes to impregnate coils of previously
insulated wire, for example, in motor generator rotors,
field coils, etc.; as molding resins, advantageaously em-
ploying various fillers; for preparing fibers, as impregnants
in bonding materials for metallic and fibrous laminates,
etc. The polyimide films are suitable as a dielectric for
making capacitors, as slot insulation in motors, etc.

Although the process whereby the intermolecular trans-
amidation takes place is not clearly understood, it is be-
lieved that the reaction between the trimellitic anhydride
hydride by the elimination of water. Initially, it is be-
lieved that the reaction between the trimellitic anhydride
and disecondary amine yields a tetracid corresponding to
the formula

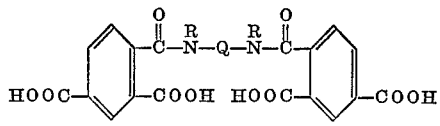

and thereafter molecules of this latter formula interact
with each other with the elimination of water and intra-
version to form the dianhydride of Formula I, where R
and Q have the meanings given above. In the practice of
my invention, it is essential that the temperature be high
enough and the reaction be carried out under such con-
ditions that water is eliminated up to the maximum or
stoichiometric amount possible by the reaction indicating
formation of the dianhydride. By employing my process,
one avoids the necessity of making any derivatives of the
reactants such as in the aforementioned U.S. Pat. 3,183,-
043 and one does not have to deal with any corrosive
by-product such as acetic acid. In addition, if the proper
temperature conditions are employed at which water
amidation is removed, the reaction takes place in a rel-
atively short period of time of the order of from 10 to
120 minutes at most. The reaction embraced by my proc-
ess goes essentially to completion so that minimum clean
up of the reaction mixture is required to isolate the de-
sired dianhydride.

Among the disecondary amines which may be employed
in the practice of the present invention are preferably
those having from 2 to 12 carbon atoms and may be
wholly aliphatic or may have aromatic substituents there-
in. Included among such disecondary amines are those,
for instance, of the formula (II) 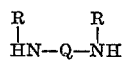

where Q has the meaning given above and R is a mono-
valent hydrocarbon radical (e.g., alkyl, for instance, methyl, ethyl, propyl, isobutyl, etc.; phenyl, alkenyl, e.g., vinyl, allyl, etc.), example of which are, for instance, N,N'-dimethylethylene diamine, N,N'-diphenylpropylene diamine, N,N'-dibutyl butylene diamine, N,N'-diphenyl ethylene diamine, N-methyl - N' - ethylethylene diamine, N,N'-diallyl propylene diamine, N,N'-diethylpropylene diamine, N,N'-dimethyl-hexylene diamine, N,N'-diethyl-dodecylene diamine, etc. Disecondary aliphatic diamines containing nitrogen in a ring, e.g., piperazine, 2-methyl piperazine, 2,6-dimethyl piperazine, and other non-nitrogen substituted methyl piperazines are also included within the term "disecondary amine" thus making the nitrogen in Formula II part of a divalent ring radical.

Generally, the reaction can be carried out by direct transamidation of the trimellitic anhydride and the amine derivative. However, the use of solvents inert to the reactants and reaction product, such as biphenyl, diphenyl ether, chlorinated aromatic hydrocarbons, cresol or mixture of cresols, etc., are not precluded as long as the boiling point of the solvent, whether at atmospheric pressure or under superatmospheric pressure is maintained at a sufficiently high temperature to remove the water of esterification as it is formed. Cresol has been found to be a preferred solvent for making the amide imides.

Generally, one employs a molar ratio of at least two moles of the trimellitic anhydride (or trimellitic acid) to about one mole of the disecondary amine reactant. The use of a molar excess of the anhydride is not precluded and it is not critical as to what molar concentrations are employed as long as the molar concentration used is that designed to give optimum formation and yield of the desired trimellitic anhydride derivative.

The temperature of reaction is generally not critical as long as the temperature used is sufficient to effect removal of the water of esterification. Generally, this will encompass temperatures of the order of about 175–300° C. or more. Obviously, the temperature employed will determine the rate of removal of the water and as higher temperatures are used, the time for removal of water will be shortened. It is also important that the water be removed from the reaction zone as it is formed in order to avoid hydrolysis of any formed anhydride product.

In order that those skilled in the art may better understand how the present invention may be practiced, the following examples are given by way of illustration and not by way of limitation.

EXAMPLE 1

A mixture of 76.8 grams (0.4 mole) trimellitic anhydride and 17.2 grams (0.2 mol) piperazine was caused to react with stirring for 15 minutes while the temperature was raised gradually during this period from 200–300° C., at the same time removing 7.1 grams of water (7.2 grams theoretical). On cooling, a product having the formula

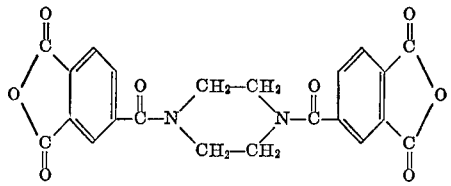

was obtained. This structure was confirmed by the following analysis: Found (percent): C, 59.3; H, 3.47; N, 6.6. Calculated (percent): C, 60.8; H, 3.24; N, 6.5.

EXAMPLE 2

When 0.2 mol N,N'-diphenyl ethylene diamine is substituted for the piperazine of Example 1 and the reaction is carried out in a cresol solvent, one obtains an amide imide having the formula

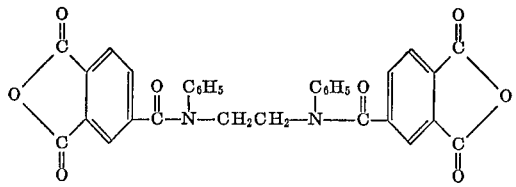

EXAMPLE 3

The composition having the formula

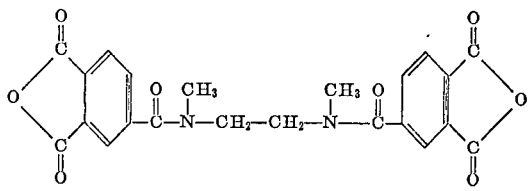

can be prepared by effecting reaction between 0.4 mol trimellitic anhydride and 0.2 mol N,N'-dimethylethylene diamine and heating the mixture under nitrogen in a cresol solvent to yield the above amide imide.

It will of course be apparent to those skilled in the art that other disecondary amines can be employed in place of those recited in the foregoing examples to yield numerous other trimellitic derivatives. The conditions of reaction can be varied widely in accordance with the disclosures and teachings of the foregoing description.

What I claim as new and desire to secure by Letters Patent of the United States is:

1. The process for making a dianhydride of the formula

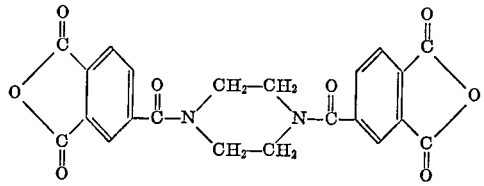

which process comprises the steps (1) forming a mixture of ingredients of (a) trimellitic anhydride and (b) piperazine and (2) heating the mixture of ingredients within the range of 175–300° C. while simultaneously removing the water formed, there being employed at least 2 mols of the trimellitic anhydride per mol of the piperazine.

References Cited

UNITED STATES PATENTS

| | | | |
|---|---|---|---|
| 3,182,074 | 5/1965 | Lonerini | 260—346.3 |
| 3,410,875 | 11/1968 | Holub | 260—346.3 |
| 3,435,002 | 3/1969 | Holub | 260—346.3 |
| 3,453,292 | 7/1969 | Izumi et al. | 260—268 C |
| 3,598,786 | 8/1971 | Yoda | 260—346.3 |
| 3,632,511 | 1/1972 | Liao | 260—268 C |

FOREIGN PATENTS

| | | | |
|---|---|---|---|
| 1,493,473 | 9/1969 | Germany | 260—346.3 |

DONALD G. DAUS, Primary Examiner

U.S. Cl. X.R.

260—346.3